United States Patent
Sakai et al.

[11] 3,894,009
[45] July 8, 1975

[54] PROSTAGLANDIN DERIVATIVES AND PROCESS FOR THE PREPARATION THEREOF

[75] Inventors: Kiyoshi Sakai; Takashi Yusa; Shigeo Amemiya; Masaaki Ito; Hamako Katano; Mitsuo Yamazaki; Mitsuko Sugiura; Koichi Kojima; Masaaki Sasaki, all of Tokyo, Japan

[73] Assignee: Sankyo Company Limited, Tokyo, Japan

[22] Filed: Dec. 4, 1973

[21] Appl. No.: 421,601

Related U.S. Application Data

[63] Continuation-in-part of Ser. No. 292,513, Sept. 27, 1972, abandoned.

[30] Foreign Application Priority Data
July 5, 1972 Japan.............................. 47-67342

[52] U.S. Cl....... 260/240 R; 260/343.5; 260/468 D; 260/468 J; 260/514 J; 424/283; 424/317
[51] Int. Cl............................................. C07c 61/32
[58] Field of Search..................... 260/240 R, 514 D

[56] References Cited
UNITED STATES PATENTS
3,678,092 7/1972 Finch.............................. 260/514 D
3,751,463 8/1973 Caton et al..................... 260/514 D

*Primary Examiner*—Arthur P. Demers
*Attorney, Agent, or Firm*—Flynn & Frishauf

[57] ABSTRACT

Prostaglandin derivative having the formula

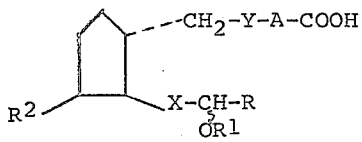

wherein R represents a straight or branched alkyl group having from one to eight carbon atoms, $R^1$ represents hydrogen atom or 2-tetrahydropyranyl group, $R^2$ represents hydroxy group, A represents a straight or branched alkylene group having from one to eight carbon atoms, X represents trans-CH=CH— and Y represents cis-CH=CH— and the pharmaceutically acceptable salts thereof. The protaglandin derivatives are useful as uterine contracting agents and may be prepared by reacting a compound having the formula

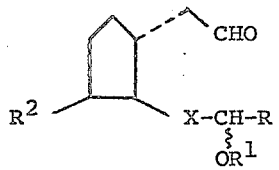

wherein R, $R^1$, $R^2$ and X are the same as above with an alkali metal salt of a phosphorane compound having the formula

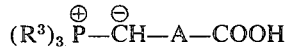

wherein A is the same as above and $R^3$ represents a hydrocarbon group and, if desired, hydrolyzing the reaction product.

4 Claims, No Drawings

PROSTAGLANDIN DERIVATIVES AND PROCESS FOR THE PREPARATION THEREOF

RELATED APPLICATION

This application is a continuation-in-part of application Ser. No. 292,513, filed Sept. 27, 1972, now abandoned.

This invention relates to novel prostaglandin derivatives which are useful as uterine contracting agents and to a process for the preparation thereof.

More particularly, it relates to prostaglandin derivatives having the formula

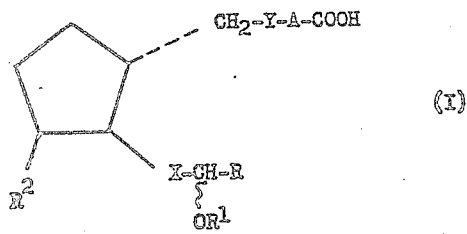

wherein R represents a straight or branched alkyl group having from one to 8 carbon atoms, $R^1$ represents hydrogen atom or 2-tetrahydropyranyl group, $R^2$ represents hydroxy group, A represents a straight or branched alkylene group having from one to 8 carbon atoms, X represents trans-CH=CH— and Y represents cis-CH=CH— and the pharmaceutically acceptable salts thereof and relates to a process for the preparation thereof.

A preferred group of prostaglandin derivatives of the formula (I) is those in which A represents trimethylene group and R represents pentyl group, i.e., a compound having the formula

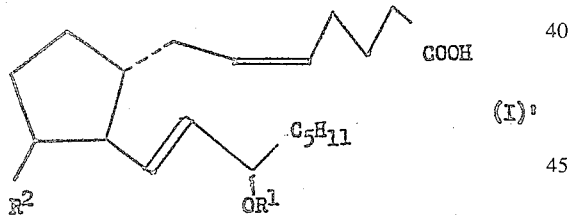

wherein $R^1$ and $R^2$ are the same as above.

The dotted line attachment shown in the above and below formulae indicates that the substituent is in the α-configuration, i.e., is below the plane of the cyclopentane nucleus and the solid line attachment indicates that the substituent is in the β-configuration, i.e., is above the plane of the cyclopentane nucleus. The wavy line attachment indicates that the substituent is in the α- or β- configuration.

The pharmaceutically acceptable salts of the compounds of this invention include salts of alkali or alkaline earth metals such as sodium, potassium, magnesium and calcium, quaternary ammonium salts such as ammonium salt, tetramethylammonium salt, tetraethylammonium salt, benzyltrimethylammonium salt, phenyltriethylammonium salt; salts of aliphatic, alicyclic or aromatic amines such as methylamine, ethylamine, dimethylamine, diethylamine, trimethylamine, triethylamine, N-methylhexylamine, cyclopentylamine, dicyclohexylamine, benzylamine, dibenzylamine, α-phenylethylamine and ethylenediamine; salts of heterocyclic amines or lower alkyl derivatives thereof such as piperidine, morpholine, pyrrolidine, piperazine, pyridine, 1-methylpiperazine and 4-ethylmorpholine; salts of amines being water soluble or containing a hydrophilic group such as monoethanolamine, ethyldiethanolamine and 2-amino-1-butanol. These salts may be prepared by conventional procedures described in the chemical literature.

As a result of earnest investigations for prostaglandin derivatives, we have unexpectedly found that the compounds having the formula (I) exhibit uterine contraction activity. For example, 15-hydroxyprosta-5(cis), 13(trans)-dienoic acid (Example 2) exhibits in final concentrations of 3–7 μg an equivalent contraction activity of smooth muscle to that of prostaglandin $E_1$ in final concentrations of 0.1 μg [tested by Magnus method using rat uterine smooth muscle]. And pregnant rat uterus at term is contracted for 15 minutes by intravenous injection of 0.1 mg./kg. of 15-hydroxyprosta-5 (cis), 13(trans)-dienoic acid (Example 2) or 200 μg/kg. of 11α, 15-dihydroxyprosta-5 (cis), 13 (trans)-dienoic acid (Example 3) respectively.

The present compounds (I) may be administered, for example as a sodium salt, by continuous intravenous injection dissolved in isotonic sodium chloride solution. The dosage is different depending upon the body weight and ages of a patient, but generally the total daily dosage for pregnant women at term is of about 10 mg – 400 mg.

According to the process of the present invention, the compound having the formula (I) can be prepared by reacting a compound having the formula

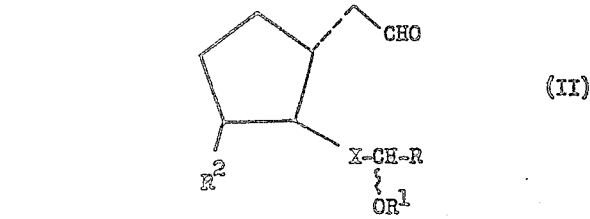

wherein R, $R^1$, $R^2$ and X are the same as above with an alkali metal salt of a phosphorane compound having the formula

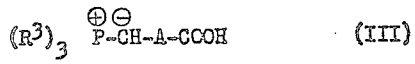

wherein A is the same as above and $R^3$ represents a hydrocarbon group and, if desired, hydrolyzing the reaction product.

The process of the present invention may be preferably carried out by contacting the compound (II) with the phosphorane compound (III) in a molar ratio of 1: about 1–10 in the presence of an inert organic solvent. It is preferable to use an excess amount of an alkali metal salt of the phosphorane compound. The phosphorane compound (III) is often referred to as "Wittig reagent" and the group $R^3$ in the formula (III) is preferably an aryl group, e.g., phenyl or an alkyl group having 1–6 carbon atoms, e.g., methyl, ethyl and n-butyl. The phosphorane compounds (III) can be prepared by known process in the art and obtained as salts of alkali metal such as sodium and potassium. Therefore, the alkali metal salts of the phosphorane compound (III) are usually employed in the present process. As a solvent, there may be employed any inert organic solvent without limitation that would be usually employed in a Wittig reaction. Examples of such a solvent include ethers, e.g., diethyl ether, tetrahydrofuran and dioxane; hydrocarbons, e.g., benzene, toluene and hexane; dialkyl sulfoxide, e.g., dimethyl sulfoxide; and halogenohydrocarbons, e.g., dichloromethane and chloroform.

The reaction temperature is not critical and the reaction is usually carried out at from 0°C to a reflux temperature of the solvent employed, preferably at room temperature. The reaction period is varied mainly depending upon the reaction temperature and a kind of the reactant. When the reaction is carried out at room temperature, the reaction period is from about 30 minutes to 40 hours. After completion of the reaction, the reaction product is separated from the reaction mixture by a conventional means. For instance, the reaction mixture is poured into ice water and the mixture is made acidic by addition of an acid such as acetic acid and oxalic acid. The mixture is extracted with a suitable solvent such as ether and ethyl acetate and the solvent is distilled off to give the desired product. The product thus obtained is, if necessary, further purified by a conventional means, for example, column chromatography and thin layer chromatography.

When the group $R^1$ in the formula (I) is tetrahydropyranyl group, the group may be, if desired, eliminated by treating the compound (I) with a weakly acidic solution.

As the acidic solution, there may be employed an organic acid solution such as formic acid-, acetic acid-, propionic acid-, butyric acid-, oxalic acid-, and malonic acid solution and a dilute inorganic acid solution such as a dilute hydrochloric acid- and a dilute sulfuric acid solution. As the solvent, there may be employed an inert solvent such as water, alcohols; e.g., methanol and ethanol, ethers, e.g., tetrahydrofuran and dioxane and mixture of water and said organic solvent.

The reaction temperature is not critical and the reaction is usually carried out within a range of from room temperature to reflux temperature of a solvent employed, preferably at room temperature.

The reaction period is varied mainly depending upon the reaction temperature and a kind of the reactant. When the reaction is carried out at room temperature, the reaction period is from about within one hour to ten hours. After completion of the reaction, the reaction product is separated from the reaction mixture by a conventional means. For instance, the desired product is separated by distilating off the solvent from the reaction mixture. The product is, if necessary, further purified by a conventional means, for example, column chromatography and thin layer chromatography. When the elimination step is carried out in a strong acidic condition, a dehydration reaction occurs as well as the elimination reaction.

In the process of this invention, the compounds (I) can be obtained as a mixture of four optical isomers caused by the configurations of the side chains attached to the cyclopentane nucleus and the configurations of the hydroxy group attached to the side chain. These racemic mixtures can be resolved at appropriate stages by method well known in the art, whereupon subsequent products may be obtained as the corresponding optically pure diastereoisomers. In the formulae (I)) and (I)', both diastereoisomeric forms as well as the racemic forms are depicted by a single representation. However, it should not be considered to limit the scope of the disclosure.

The compounds (II) employed as a starting material are novel and prepared according to the following reaction sequence;

1. Preparation of the compound (II) in which $R^2$ is hydrogen atom

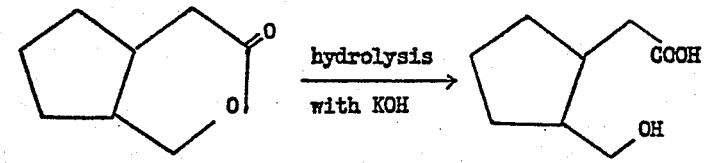

Angewandte Chemie
875 (1970)

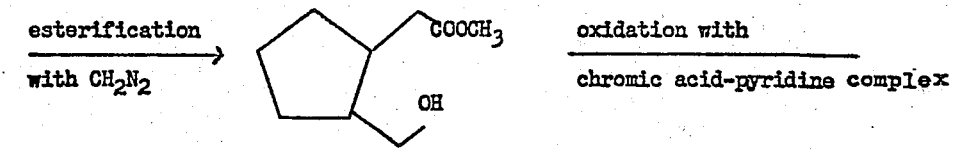

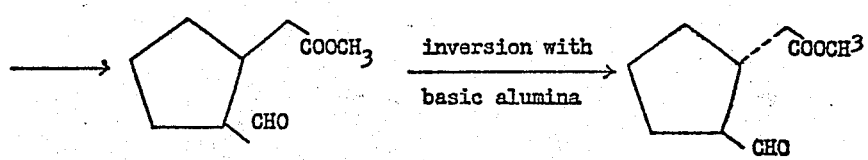

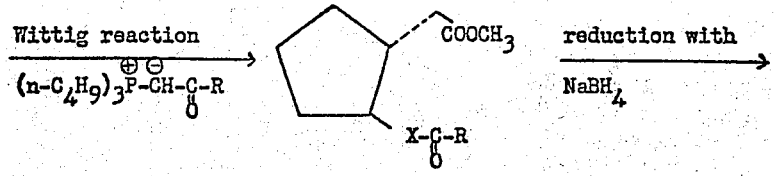

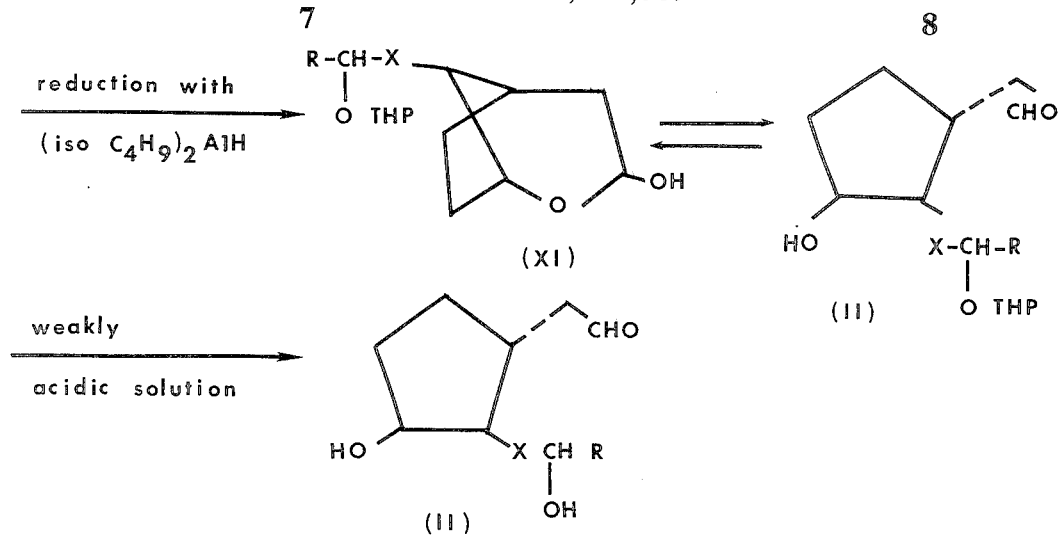

In the above formulae, R and X are the same as above, R[4] represents an alkyl group and THP represents 2-tetrahydropyranyl group.

The compound (V) may be prepared by subjecting the compound (IV) to catalytic reduction with palladium on charcoal. The reduction is preferably carried out in an inert solvent, e.g., water, methanol, ethanol and ether at room temperature.

The compound (VI) may be prepared by contacting the compound (V) with boron halide, e.g., boron trichloride and boron tribromide. The reaction is preferably carried out in an inert organic solvent, e.g., dichloromethane and chloroform at a temperature ranging from −50°C. to room temperature, usually at 0°C.

The compound (VII) may be prepared by oxidizing the compound (VI) with chromic acid-pyridine complex. The reaction is preferably carried out in an inert organic solvent, e.g., acetic acid, dichloromethane and chloroform at a temperature ranging from 0°C. to room temperature.

The compound (VIII) may be prepared by reacting the compound (VII) with a Wittig reagent having the formula

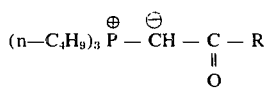

At least one mole of the Wittig reagent is used per mole of the compound (VII) and preferably from 2 to 10 moles of the Wittig reagent is used. The reaction is generally carried out in an inert organic solvent, e.g., ether, benzene and chloroform at a temperature ranging from 0°C. to a reflux temperature of the reaction.

The compound (IX) may be prepared by reducing the compound (VIII) with sodium boron hydride. The reduction is preferably carried out in an inert organic solvent, e.g., methanol, tetrahydrofuran and ether at a temperature ranging from −10°C. to room temperature.

The compound (X) may be prepared by contacting the compound (IX) with dihydropyran in the presence of p-toluenesulfonic acid. The reaction is preferably carried out in an inert organic solvent, e.g., chloroform, acetonitrile and benzene at a temperature ranging from 0°C. to room temperature.

The compound (XI) and (II) may be prepared by reducing the compound (X) with diisobutylaluminum hydride. The reduction is preferably carried out in an inert organic solvent, e.g., methanol, ethanol, tetrahydrofuran and benzene at a temperature ranging from −75°C. to room temperature.

The compound (II)' may be prepared by treating the compound (XII) and/or (II) with weakly acidic solution such as a dilute solution of acetic acid, hydrochloric acid or sulfuric acid.

The product obtained in each step of the above process may be recovered from the reaction mixture in a conventional manner, for example, by evaporating the solvent from the reaction mixture or by adding water to the reaction mixture and extracting with a water-immiscible solvent. The crude product can be purified by conventional means such as recrystallization or chromatography.

The following preparations, examples and referential examples are given for the purpose of illustration of the present invention.

Preparation of
2-{2β-[3-(2-tetrahydropyranyl)oxy-trans-1-octenyl]-3α-hydroxycyclopent-1α-yl} ethanol (II) and
2-[2β-(3-hydroxy-1-trans-octenyl)-3α-hydroxycyclopent-1α-yl] ethanol (II)'

1. 1-hydroxy-2-methoxymethyl-3-acetic acid cyclopentane-1,3(δ)-lactone (V).

In 19 ml. of ethanol is dissolved 5 g. of 1-hydroxy-2-methoxymethyl-3-acetic acid cyclopent-4-ene-1,3(δ)-lactone (IV) and to the solution is added dropwise 3 g. of 5% palladium on charcoal in 108 ml. of ethanol. The mixture is subjected to catalytic reduction in a hydrogen atmosphere.

After completion of the absorption of hydrogen gas, the catalyst is filtered off from the reaction mixture and the solvent is distilled off from the filtrate under reduced pressure to give 4.75 g. of oily residues. The residues are subjected to column chromatography using 50 g. of silica gel and eluted with some amount of benzene and next successively with 1 − 15 percent solution of ether in benzene. The eluations from the latter solvent are collected and the solvent is distilled off to give 4.2 g. of the desired product as oil.

I.R. (liquid film) $\nu_{max}$cm$^{-1}$:1740
N.M.R. (CDCl$_3$)τ:ppm

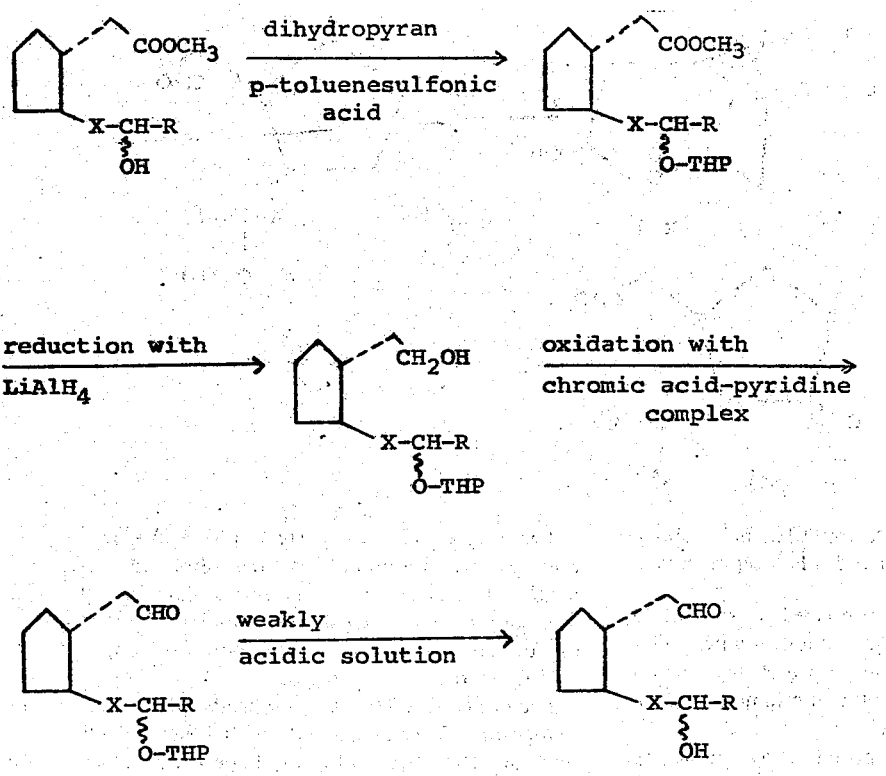
(2) Preparation of the compound (II) in which $R^2$ is hydroxy group
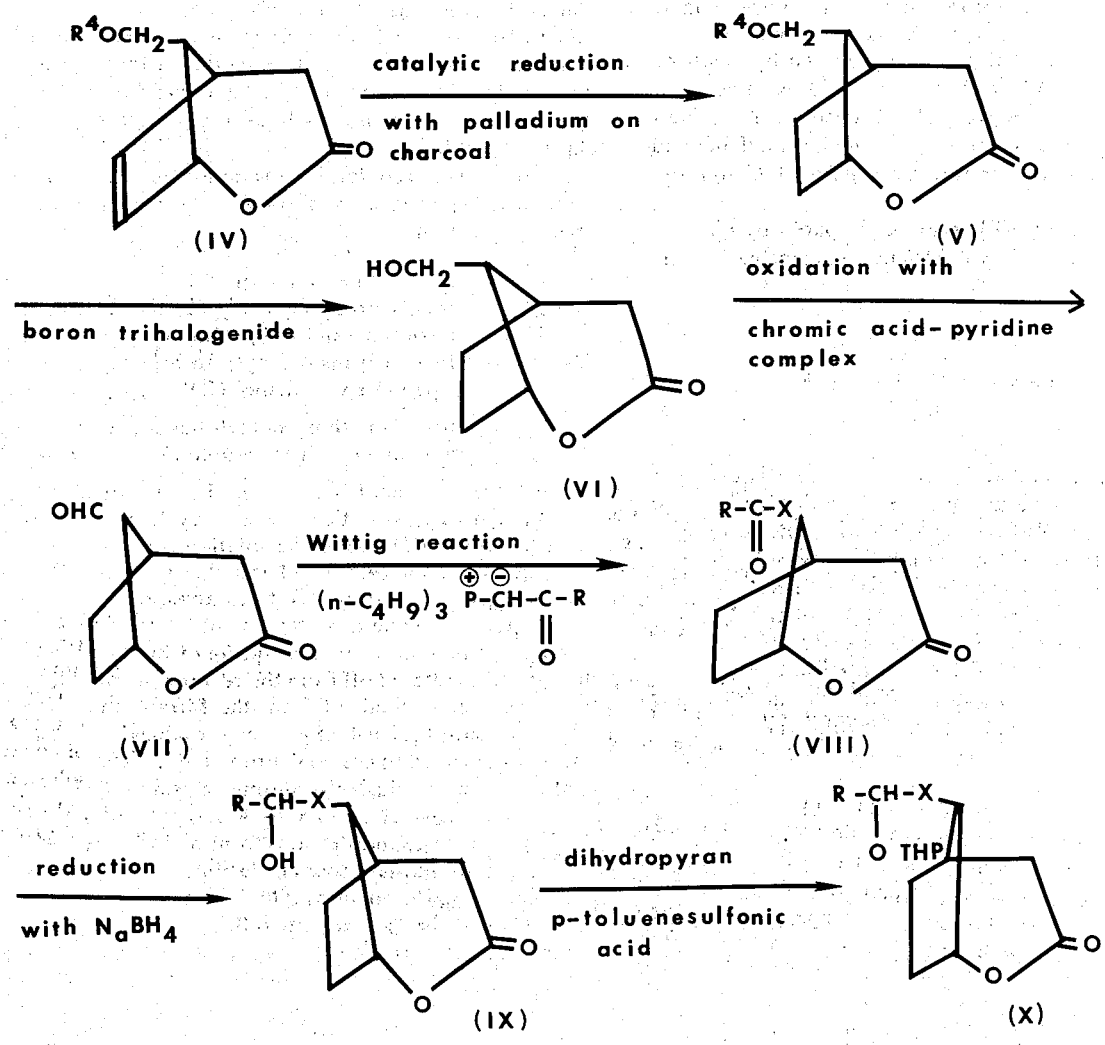

6.64 (3H, singlet, -OC$\underline{H}_3$)

5.24 (1H, broad, 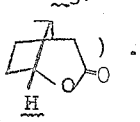 ).

2. 1-hydroxy-2-hydroxymethyl-3-acetic acid cyclopentane-1,3(δ)-lactone (VI).

A solution of 4.9 g. of 1-hydroxy-2-methoxymethyl-3-acetic acid cyclopentane-1,3(δ)-lactone (V) in 50 ml. of dichloromethane is cooled to a temperature ranging from −45°C. to −15°C. and to the solution is added dropwise a solution of 35.8 g. of boron tribromide in 30 ml. of dichloromethane. After completion of the addition, the temperature of the reaction mixture is slowly elevated to 0°C. and the mixture is stirred for 2 hours at 0°C. After completion of the reaction, aqueous sodium bicarbonate is added to the reaction mixture to precipitate white oils. To the reaction mixture is added Rochelle salt and the mixture is extracted with chloroform. The solvent is distilled off to give 3.9 g. of the desired product as oil.

I.R. (liquid film) $\nu_{max}$cm$^{-1}$: 3470, 1725
N.M.R. (CDCl$_3$) τ: ppm 6.56 (2H, doublet, -C$\underline{H}_2$OH)

5.2 (1H, multiplet, 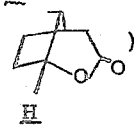 )

Mass spectrum M$^{\oplus}$: 156 (C$_8$H$_{12}$O$_3$).

3. 1-hydroxy-2-formyl-3-acetic acid cyclopentane-1,3(δ)-lactone (VII).

To a solution of 3.9 g. of 1-hydroxy-2-hydroxymethyl-3-acetic acid cyclopentane-1,3(δ)-lactone (VI) in 200 ml. of dichloromethane is added 15 g. of chromic acidpyridine complex and the mixture is stirred at room temperature for 15 minutes. After completion of the reaction, the solvent is removed by decantation and extracted with ethyl acetate. The solvent is distilled off to give 1 g. of the desired product as oil.

I.R. (liquid film) $\nu_{max}$cm$^{-1}$: 2720, 1730
N.M.R. (CDCl$_3$)τ: ppm
4.9 (1H, broad, 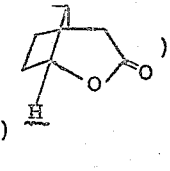 )

0.9 (1H, -C = O)

4. 1-hydroxy-2-(3-oxo-trans-1-octenyl)-3-acetic acid cyclopentane-1,3(δ)-lactone (VIII).

To a solution of 0.69 g. of 1-hydroxy-2-formyl-3-acetic acid cyclopentane-1,3(δ)-lactone (VII) in 10 ml. of ether is added 1.8 g. of 2-oxoheptylidene-tri-n-butylphosphorane and the solution is stirred at room temperature for 5 hours. After completion of the reaction, the solvent is distilled off to give 2.6 g. of oily residues.

The residues are subjected to column chromatography using 26 g. of silica gel and eluted with some amount of hexane — 40% solution of benzene in hexane and next successively with 50–70% solution of benzene in hexane. The eluates with the latter solvent are collected and the solvent is distilled off to give 2.2 g. of oily residues.

The residues are further subjected to column chromatography using 20 g. of silica gel and eluted with some amount of hexane — 40% solution of benzene in hexane and next successively with 50–70% solution of benzene in hexane. The eluates with the latter solvent are collected and the solvent is distilled off to give 1.2 g. of the desired product as oil.

I.R. (liquid film) $\nu_{max}$cm$^{-1}$: 1745, 1675
N.M.R. (CDCl$_3$) τ : ppm 5.25 (1H, multiplet 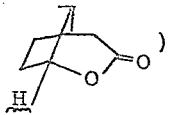 )

3.75 (1H, doublet, J = 16 cps.  )

3.40 (1H, double doublet, J$_1$ = 16 cps.
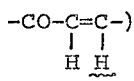

Mass spectrum M$^{\oplus}$: 250 (C$_{15}$H$_{22}$O$_3$).

5. 1-hydroxy-2-(3-hydroxy-trans-1-octenyl)-3-acetic acid cyclopentane-1,3(δ)-lactone (IX).

To a solution of 0.83 g. of 1-hydroxy-2-(3-hydroxy-trans-1-octenyl)-3-acetic acid cyclopentane-1,3(δ)-lactone (VIII) in 5 ml. of ethanol is added 0.13 g. of sodium boron hydride and the mixture is stirred for 20 minutes under ice cooling. After completion of the reaction, 5% aqueous acetic acid is added to the reaction mixture to decompose the excess sodium boron hydride. A saturated aqueous sodium chloride solution is added to the reaction mixture and the mixture is extracted with ethyl acetate. The extract is washed with water and dried over anhydrous sodium sulfate. The solvent is distilled off to give 0.66 g. of the desired product as oil.

I.R. (liquid film) $\nu_{max}$cm$^{-1}$: 1740, 1050
N.M.R. (CDCl$_3$)τ : ppm 5.3 (1H, multiplet, 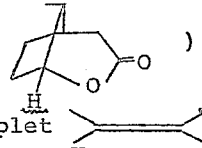 )

4.7 – 4.3 (2H, multiplet 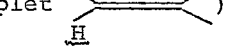 )

Mass spectrum M$^{\oplus}$: 252 (C$_{15}$H$_{24}$O$_3$).

6. 1-hydroxy-2-[3-(2-tetrahydropyranyl)-oxy-trans-1-octenyl]-3-acetic acid cyclopentane-1,3(δ)-lactone (X).

To a solution of 0.14 g. of 1-hydroxy-2-(3-hydroxytrans-1-octenyl)-3-acetic acid cyclopentane-1,3(δ)-lactone (IX) in 3 ml. of benzene is added 1 ml. of dihydropyran under ice cooling. To the mixture is added under ice cooling a solution prepared by dissolving 5 mg. of p-toluenesulfonic acid in 2 ml. of benzene under heating.

After completion of the addition, the temperature of the reaction mixture is slowly elevated to room temperature with stirring. After completion of the reaction, the solvent is distilled off to give oily residues. The residues obtained are subjected to column chromatography using 5 g. of aluminum (Grade II, a product of Woelm Co.) and eluted with some amount of hexane — 40% solution of benzene in hexane and next successively with 50–70% solution of benzene in hexane. The eluates with the latter solvent are collected and the solvent is distilled off to give 0.16 g. of the desired product as oil.

I.R. (liquid film) $\nu_{max}$cm$^{-1}$: 1745,1015
N.M.R. (CDCl$_3$)$\tau$: ppm
4.63 – 4.35 (2H, multiplet,

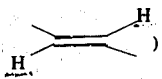
)

Mass spectrum M$^{\oplus}$: 336 (C$_{20}$H$_{32}$O$_4$)

7.

2-{2β-[3-(2-tetrahydropyranyl)oxy-trans-1-octenyl]-3α-hydroxycyclopent-1α-yl}-ethanal (II) { equilibrium mixture with 1-hydroxy-2-[3-(2-tetrahydropyranyl)oxy-1-trans-octenyl]-3-acetaldehydecyclopent-1,3(δ)-lactol (XI)}.

In 10 ml. of toluene is dissolved 502 mg. of 1-hydroxy-2-[3-(2-tetrahydropyranyl)oxy-trans-1-octenyl]-3-acetic acid cyclopentane-1,3(δ)-lactone (X) and to the solution is added a solution of 0.85 g. of diisobutylaluminum hydride in 61.5 g. of toluene at −60°C.∼−70°C. in an argon atmosphere followed by stirring for 2 hours. After completion of the reaction, a saturated aqueous sodium sulfate is added to the reaction mixture and the mixture is extracted with ethyl acetate.

The solvent is distilled off to give 543 mg. of the desired product as oil.

I.R. (liquid film) $\nu_{max}$cm$^{-1}$: 3420, 2750, 1725, 1015, 970
Mass spectrum M$^{\oplus}$: 338 (C$_{20}$H$_{34}$O$_4$)

8.

2-[2β-(3-hydroxy-1-trans-octenyl)-3α-hydroxycyclopent-1α-yl]ethanol (II)'.

In 50 ml. of a mixture of water, acetic acid and tetrahydrofuran (35:30:35) is dissolved 413 mg. of 2-{2β-[3-(2-tetrahydropyranyl)oxy-trans-1-octenyl]-3α-hydroxycyclopent-1α-yl}ethanal and the solution is stirred at 40°–50°C. for 4 hours.

After completion of the reaction, the solvent is distilled off under reduced pressure. Oily residues obtained are subjected to column chromatography using 4 g. of silica gel and eluted successively with benzene and 1–3% solution of ether in benzene, respectively. The eluates with the latter solvent are collected and the solvent is distilled off to give 120 mg. of the desired product as oil.

I.R. (liquid film) $\nu_{max}$cm$^{-1}$: 3450, 1720, 970
Mass spectrum M$^+$: 254 (C$_{15}$H$_{26}$O$_3$).

The following examples are presented to further illustrate the present invention.

EXAMPLE 1

15-Tetrahydropyranyloxyprosta-5 (cis), 13(trans)-dienoic acid

In 4.5 ml. of dimethyl sulfoxide is dissolved 4.05 g. of 5-triphenylphosphonio pentanoic acid bromonium salt. To the solution is added 8.3 ml. of a solution which is prepared by adding 0.96 g. of sodium hydride (50% content) to 10 ml. of dimethyl sulfoxide and stirring the mixture at 70°C. for 2 hours. The mixture is stirred at room temperature for 15 minutes and added to 2 ml. of dimethyl sulfoxide solution containing 320 mg. of 2-[2β-(3-tetrahydropyranyloxy-1-(trans)-octenyl) cyclopent-1α-yl]ethanal. The solution is stirred at room temperature for 30 hours. After completion of the reaction, the reaction mixture is poured into ice water. The mixture is adjusted to pH3 by addition of oxalic acid and extracted with ethyl acetate 4 times. The extract is dried over anhydrous sodium sulfate and the solvent is distilled off to give 290 mg. of an oil. The oil is chromatographed on 5 g. of silica gel and eluted successively with benzene for a while and next benzene containing 2–10% ether.

The eluates with the latter solvent are collected and the solvent is distilled off to give 140 mg. of the pure desired product as oil.

N.M.R. (CDCl$_3$)δ: ppm
8.2 (1H, broad, singlet, —COOH)
5.5 (4H, broad,

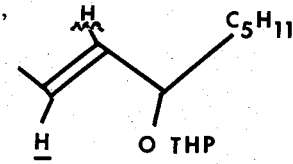

and

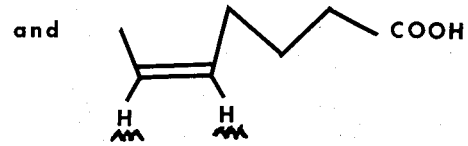

EXAMPLE 2

15-Hydroxyprosta-5 (cis), 13 (trans)-dienoic acid

In 3 ml. of dimethyl sulfoxide is dissolved 0.34 g. of sodium hydride (50% content) and the solution is stirred at 80°C for 1.5 hours.

To the solution is added 450 mg. of 5-triphenylphosphonio pentanoic acid bromonium salt. To the solution thus obtained is added 93 mg. of 2-[2β-(3-hydroxy-1(trans)-octenyl) cyclopent-1α-yl] ethanal in 1 ml of dimethyl sulfoxide. The solution is stirred at room temperature for 4 hours. After completion of the reaction, the reaction mixture is poured into ice water. The mixture is adjusted to pH3 by addition of oxalic acid and extracted with ether 3 times. The extract is dried over anhydrous sodium sulfate and the solvent is distilled off to give 230 mg. of an oil. The oil is chromatographed on 3 g. of silica gel and eluted successively with benzene for a while and next with benzene solution containing 1–5% ether.

The eluates with the latter solvent are collected and the solvent is distilled off to give 62 mg. of the pure desired product as oil.

I.R. (liquid film)$\nu$max$^{cm^{-1}}$ : 3300–3400, 1710, 970
N.M.R. (CDCl$_3$)$\tau$: ppm
6.6 (2H, singlet, —COOH, —OH)
5.4 (4H, broad,

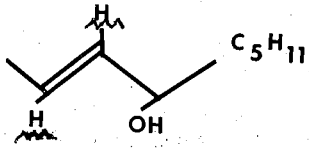

and

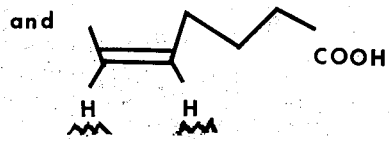

Mass spectrum M⁺: 322 ($C_{20}H_{34}O_3$)

EXAMPLE 3

11α, 15-Dihydroxyprosta-5 (cis), 13 (trans)-dienoic acid

In 5 ml. of dimethyl sulfoxide is dissolved 261 mg. of 2-[2β-(3-hydroxy-1(trans)-octenyl)-3α-hydroxycyclopent-1α-yl]ethanal [equilibrium mixture with 1-hydroxy-2-[3-hydroxy-1(trans)-octenyl)]-3-acetaldehyde-cyclopent-1.3(δ)-lactol]. To the solution is added 1.78 g. of sodium 5-triphenylphosphonio pentanoate in 12 ml. of dimethyl sulfoxide (0.37 mole concentration dimethyl sulfoxide solution of sodium 5-triphenylphosphonio pentanoate). The mixture is stirred at room temperature for 3 hours. After completion of the reaction, an 5% aqueous acetic acid solution is added to the reaction mixture. The mixture is extracted with ether. The extract is washed with water and dried over anhydrous sodium sulfate. The solvent is distilled off. The residue is chromatographed on 3 g. of silica gel and eluted successively with benzene for a while and next benzene solution containing 1-20% ether.

The eluates with the latter solvent are collected and the solvent is distilled off to give 40 mg. of the desired product as oil.

I.R. (liquid film)$\nu$max$^{cm^{-1}}$ : 3360, 3020, 1710, 970
N.M.R. (CDCl₃)τ: ppm
9.12 (3H, triplet, —CH₃)

6.00 (2H, broad, 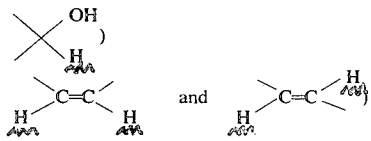)

4.50 (4H, multiplet 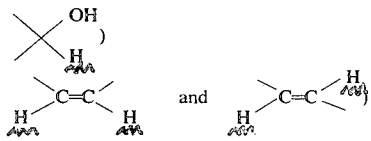 and ...)

Mass spectrum M⁺: 338.47($C_{20}H_{34}O_4$)

EXAMPLE 4

11α-hydroxy-15-(2-tetrahydropyranyl)oxyprosta-5(cis), 13(trans)-dienoic acid

In 8 ml. of dimethyl sulfoxide is dissolved 500 mg. of 2-{2β-[3-(2-tetrahydropyranyl)oxy-1(trans)-octenyl]-3α-hydroxycyclopent-1α-yl}ethanal (equilibrium mixture with 1-hydroxy-2-[3-(2-tetrahydropyranyl)oxy-1(trans)-octenyl]-3-acetaldehydecyclopent-1,3(δ)-lactol).

To the solution is added 2.96 g. of sodium 5-triphenylphosphonio pentanoate in 20 ml. of dimethyl sulfoxide (0.37 mole concentration dimethyl sulfoxide solution of sodium 5-triphosphonio pentanoate). The mixture is stirred at room temperature for 3 hours. After completion of the reaction, an 5% aqueous acetic acid solution is added to the reaction mixture. The mixture is extracted with ethyl acetate. The extract is washed with water and dried over anhydrous sodium sulfate. The solvent is distilled off. The residue is chromatographed on 1 g. of silica gel and eluted successively with benzene solution containing 20% ethanol and next with benzene solution containing 25-30% ether. The eluates with the latter solvent are collected and the solvent is distilled off to give 790 mg. of the desired product as oil.

I.R. (liquid film)$\nu$max$^{cm^{-1}}$ : 3400, 1710, 1015

N.M.R. (CDCl₃)τ: ppm 4.7 – 4.4 (4H, multiplet 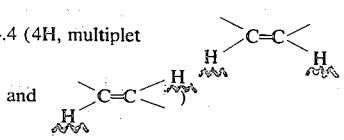

and ...)

Mass spectrum M⊕: 422 ($C_{25}H_{42}O_5$)

REFERENTIAL EXAMPLE

1. Hydrolysis of 15-tetrahydropyranyloxyprosta-5(cis), 13(trans)-dienoic acid

In a mixture of 2 ml. of acetic acid and 1 ml. of water is dissolved 91 mg. of 15-tetrahydropyranyloxyprosta-5(cis), 13(trans)-dienoic acid and the solution is stirred at 30°C for 3 hours. After completion of the reaction, the solvent is distilled off from the reaction mixture under reduced pressure to give 78 mg. of oil. The oil is chromatographed on 2 g. of silica gel and eluted successively with benzene for a while and next benzene solution containing 2-20% ether. The eluates with the latter solvent are collected and the solvent is distilled off to give 69 mg. of 15-hydroxyprosta-5(cis), 13(trans)-dienoic acid as oil. The infrared absorption spectrum, nuclear magnetic resonance spectrum and mass spectrum of the product thus obtained are the same as those of the product obtained in Example 2.

2. Hydrolysis of 2-[2β-(3-tetrahydropyranyloxy-trans-1-octenyl)cyclopent-1α-yl]ethanal In a mixture of 1 ml. of tetrahydrofuran, 8 ml. of acetic acid and 1 ml. of water is dissolved 230 mg. of 2-[2β-(3-tetrahydropyranyloxy-trans-1-octenyl)cyclopent-1α-yl]ethanal and the solution is stirred at room temperature for 4 hours. After completion of the reaction, the solvent is distilled off from the reaction mixture under reduced pressure to give 240 mg. of oil. The oil is chromatographed on 1.2 g. of silica gel and eluted successively with benzene for a while and next benzene solution containing 1-5% ether. The eluates with the latter solvent are collected and the solvent is distilled off to give 160 mg. of 2-[2β-(3-hydroxy-trans-1-octenyl) cyclopent-1α-yl]ethanal as oil.

I.R. (liquid film)$\nu$max$^{cm^{-1}}$ : 3450, 2700, 1740, 970
N.M.R. (CDCl₃)δ: ppm
9.21 (1H, broad singlet, —CHO)
5.1 - 5.3 (2H, multiplet, 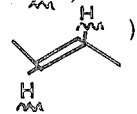 )

3. Hydrolysis of 11α-hydroxy-15-(2-tetrahydropyranyl)oxyprosta-5(cis), 13(trans)-dienoic acid In 30 ml. of a mixture of water, acetic acid, tetrahydrofuran (35:30:35) is dissolved 549 mg. of 11α-hydroxy-15-(2-tetrahydropyranyl) oxyprosta-5 (cis), 13(trans)-dienoic acid and the solution is stirred at 40-50°c for 3 hours. After completion of the reaction, the solvent is distilled off. The oily residue is chromatographed on 5 g. of silica gel and eluted successively with benzene for a while and next with benzene solution containing 1-20% ether. The eluates with the latter solvent are collected and the solvent is distilled off to give 150 mg. of the desired product as oil. The infrared absorption spectrum, nuclear magnetic resonance spectrum and mass spectrum of the product thus obtained are the same as those of the product obtained in Example 3.

4. Preparation of potassium 15-hydroxyprosta-5(cis), 13(trans)-dienoate

In 10 ml. of methanol is dissolved 305 mg. of 15-hydroxyprosta-5(cis), 13(trans)-dienoic acid and to the solution is added 75 mg. of potassium carbonate in 5 ml. of water. The mixture is stirred at room temperature for 3 hours. After completion of the reaction, the solvent is distilled off under reduced pressure to give 310 mg. of the desired product as oil.

I.R. (liquid film)$\nu$max$^{cm^{-1}}$ : 3350, 1570, 1400, 980

5. Preparation of potassium 11α, 15-dihydroxyprosta-5(cis), 13(trans)-dienoate

In 10 ml. of methanol is dissolved 350 mg. of 11α, 15-dihydroxyprosta-5(cis), 13(trans)-dienoic acid and to the solution is added 78 mg. of potassium carbonate in 5 ml. of water. The mixture is stirred at room temperature for 3 hours. After completion of the reaction, the solvent is distilled off under reduced pressure to give 360 mg. of the desired product as oil.

I.R. (liquid film)$\nu$max$^{cm^{-1}}$ : 3400, 1570, 1400, 980

What is claimed is:

1. A 11,15-dihydroxyprosta-5(cis),13(trans)-dienoic acid having the formula

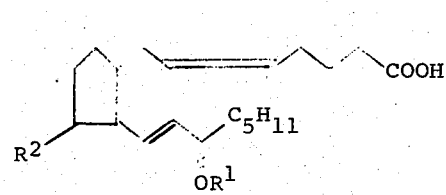

wherein R¹ represents a hydrogen atom or a 2-tetrahydropyranyl group and R² represents a hydroxy group and the pharmaceutically acceptable salts thereof.

2. A compound of claim 1 comprising 11α, 15-dihydroxyprosta-5(cis), 13(trans)-dienoic acid.

3. A compound of claim 1 comprising 11α-hydroxy-15-(2-tetrahydropyranyl)oxyprosta-5(cis), 13(trans)-dienoic acid.

4. A compound of claim 1 comprising potassium 11α, 15-dihydroxyprosta-5(cis), 13(trans)-dienoate.

* * * * *

UNITED STATES PATENT AND TRADEMARK OFFICE
CERTIFICATE OF CORRECTION

PATENT NO. : 3,894,009            Page 1 of 2
DATED : July 8, 1975
INVENTOR(S) : KIYOSHI SAKAI et al It is certified that error appears in the above-identified patent and that said Letters Patent are hereby corrected as shown below:

First page, second column, line 9: replace "protaglandin"
     with --- prostaglandin ---.

Column 1, line 61: after "calcium", replace the comma
     (",") with a semicolon (";").

Columns 5-6, Compounds (IX) and (X): at "R-CH-X", the
     bond to "OH" (in Comp. IX) and to "O-THP" (in
     Comp. X) should be a wavy line ( ⸾ ).

Column 6, Compound (X): insert a single bond between
     "O" and "THP".

Column 7, Compound (II) (second occurrence):
     "(II)" should be --- (II)' ---.

Columns 7-8, Compounds (XI), (II) and (II)': at
     "R-CH-X" (XI) and "X-CH-R" (II and II'), the
     bond to "O-THP" (XI and II) and "OH" (II')
     should be a wavy line ( ⸾ ).

UNITED STATES PATENT AND TRADEMARK OFFICE
CERTIFICATE OF CORRECTION

PATENT NO. : 3,894,009
DATED : July 8, 1975
INVENTOR(S) : KIYOSHI SAKAI et al

It is certified that error appears in the above-identified patent and that said Letters Patent are hereby corrected as shown below:

Columns 7-8, Compounds (XI), (II) and (II)': insert a single bond between "O" and "THP" and between "X" and "CH" and "R".

Column 9, line 40: replace "acidpyridine" with --- acid - pyridine ---.

Column 12, lines 20-25, in the Compound: insert a single bond between "O" and "THP".

Column 12, line 57: at "-COOH" and "-OH", the "H" should be underscored with a wavy line (--- H ---).

Signed and Sealed this

Twenty-fourth Day of October 1978

[SEAL]

Attest:

RUTH C. MASON
Attesting Officer

DONALD W. BANNER
Commissioner of Patents and Trademarks